US012618289B2

(12) United States Patent
Metcalf

(10) Patent No.: US 12,618,289 B2
(45) Date of Patent: May 5, 2026

(54) APPARATUS FOR CAPTURING AXIAL FORCE ON AN INNER DRIVE MEMBER

(71) Applicant: The Charles Machine Works, Inc., Perry, OK (US)

(72) Inventor: Max A. Metcalf, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 19/043,909

(22) Filed: Feb. 3, 2025

(65) Prior Publication Data

US 2025/0179875 A1     Jun. 5, 2025

Related U.S. Application Data

(63) Continuation of application No. 18/341,366, filed on Jun. 26, 2023, now Pat. No. 12,215,586, which is a continuation of application No. 17/542,018, filed on Dec. 3, 2021, now Pat. No. 11,708,724.

(60) Provisional application No. 63/123,168, filed on Dec. 9, 2020.

(51) Int. Cl.
| *E21B 7/00* | (2006.01) |
| *E21B 3/02* | (2006.01) |
| *E21B 7/04* | (2006.01) |
| *E21B 17/00* | (2006.01) |
| *F16D 3/06* | (2006.01) |

(52) U.S. Cl.
CPC ................ *E21B 7/002* (2013.01); *E21B 3/02* (2013.01); *E21B 7/046* (2013.01); *E21B 17/00* (2013.01); *F16D 3/06* (2013.01)

(58) Field of Classification Search
CPC . E21B 17/00; E21B 7/046; E21B 3/02; E21B 7/002
See application file for complete search history.

(56) References Cited

U.S. PATENT DOCUMENTS

| 6,761,231 | B1 * | 7/2004 | Dock | ........................ E21B 4/14 |
| | | | | 175/74 |
| 7,152,700 | B2 * | 12/2006 | Church | ................. E21B 17/203 |
| | | | | 175/320 |
| 7,628,226 | B2 | 12/2009 | Mitchell et al. | |
| 7,658,242 | B2 | 2/2010 | Duncan | |
| 9,598,905 | B2 | 3/2017 | Van Zee et al. | |
| 9,611,695 | B2 | 4/2017 | Slaughter, Jr. et al. | |
| 9,765,574 | B2 | 9/2017 | Slaughter, Jr. et al. | |
| 10,711,521 | B2 | 7/2020 | Vos et al. | |
| 10,851,588 | B2 | 12/2020 | Langenfeld et al. | |

(Continued)

*Primary Examiner* — Tara Schimpf
*Assistant Examiner* — Lamia Quaim
(74) *Attorney, Agent, or Firm* — Tomlinson Mckinstry, P.C.

(57) ABSTRACT

A spindle with a mechanism for transferring axial force from an inner drive assembly to an outer drive assembly. The spindle's inner drive shaft is connected to an inner member of a dual-rod pipe by a drive rod having a sliding sleeve. The sleeve is fixed rotationally with the drive shaft, but not axially. When axial force drives the drive rod toward the drive member of the spindle, the sleeve contacts a stop member which is paired to the outer drive assembly. The stop member may be a pair of dowel pins. Axial force is thereby transferred from the inner member to the outer member, allowing such forces to be absorbed by the outer member's larger drive components.

17 Claims, 9 Drawing Sheets

(56)          References Cited

U.S. PATENT DOCUMENTS

| | | | |
|---|---|---|---|
| 11,149,501 B2 | 10/2021 | Smith | |
| 2011/0005838 A1* | 1/2011 | Granberg | E21B 17/18 |
| | | | 175/293 |
| 2019/0226283 A1 | 7/2019 | Slaughter et al. | |

* cited by examiner

APPARATUS FOR CAPTURING AXIAL FORCE ON AN INNER DRIVE MEMBER

SUMMARY

The present invention is directed to an apparatus. The apparatus comprises an inner member, an outer member, an inner drive shaft, a hollow sleeve, and at least one pin. The inner member is disposed along a longitudinal axis. The outer member is at least partially surrounding the inner member and disposed about the longitudinal axis. The inner drive shaft is coupled to a motor. The hollow sleeve is joined to the inner member in sliding, torque-transmitting engagement with the inner drive shaft. The at least one pin is disposed through the outer member and transverse to the longitudinal axis. The at least one pin is configured to transmit axial force from the hollow sleeve to the outer member.

The present invention is also directed to a spindle. The spindle comprises an inner drive rod apparatus, a hollow outer member, and at least one stop member. The inner drive apparatus is disposed about a longitudinal axis and comprises a drive shaft, an inner drive rod, and a hollow sleeve. The inner drive rod is configured for connection to an inner member of a dual-member drive string. The hollow sleeve has a first end, a second end, and an internal surface. The hollow sleeve is slidingly supported and rotationally coupled to the drive shaft at its internal surface and joined to the drive rod at its first end. The hollow outer member is at least partially disposed about the inner drive rod apparatus. The outer member is independently rotatable relative to the inner drive rod apparatus. The at least one stop member is supported by the outer member and configured to engage with the second end of the hollow member.

In another aspect the invention is directed to an assembly for connecting a dual-member drill string to a gearbox. The dual-member drill string comprises independently rotatable inner and outer members. The assembly comprises an inner assembly, an outer assembly, and a stop member. The inner assembly is connected at a first end to the gearbox and a second end to the rotatable inner member of the dual-member drill string. The inner assembly comprises a drive shaft, a drive rod, and a hollow sleeve. The drive shaft is rotatable about a longitudinal axis and has a first outer diameter. The drive rod is configured for torque transmitting connection to the rotatable inner member. The hollow sleeve has a second outer diameter and is joined to the drive rod and partially surrounding the drive shaft in a torque-transmitting relationship. The hollow sleeve is configured to move axially relative to the drive shaft.

The outer assembly comprises a cavity in which the hollow sleeve and drive shaft are partially housed. The cavity defines a first inner diameter. The first inner diameter is greater than the first outer diameter and the second outer diameter. The stop member is disposed through the outer assembly and extends into the cavity. An effective inner diameter of the cavity at the stop member is greater than the first outer diameter and less than the second outer diameter.

DETAILED DESCRIPTION

In many horizontal directional drilling applications it is preferable to utilize a dual pipe system. Dual pipe systems are particularly useful for drilling through rock, as the rotation of the inner pipe and outer pipe may be used, independently of one another, to drive rotation of a drill bit and to change the orientation of a steering feature. An example of a dual pipe system is disclosed in U.S. Pat. No. 9,765,574, issued to Slaughter, Jr. et al ("Slaughter"), the contents of which are incorporated herein by reference.

Figure 8:
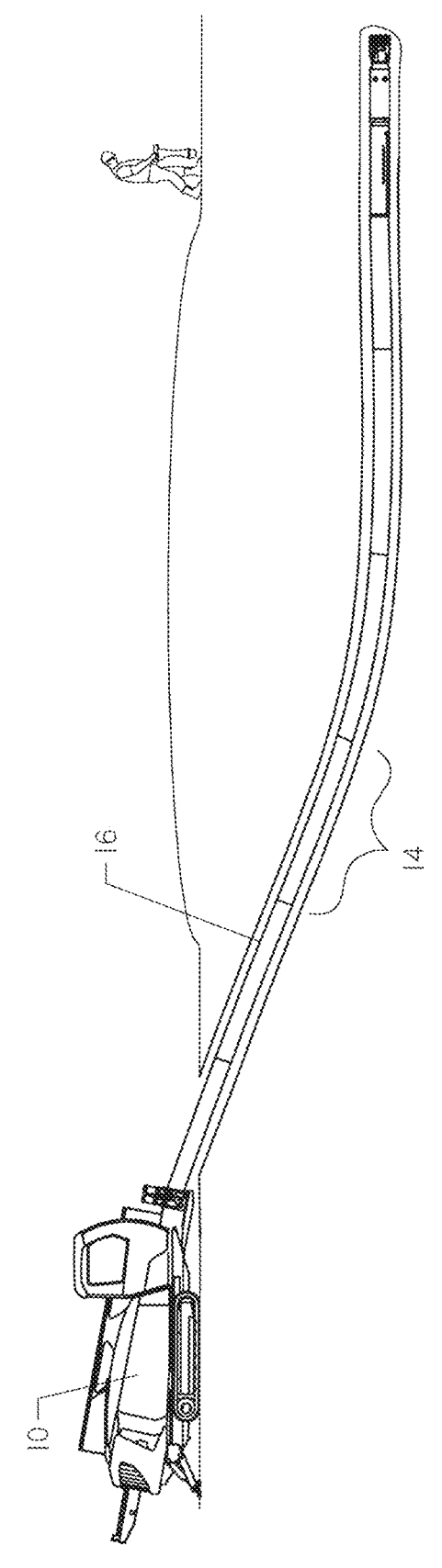
FIG. 8 is a diagrammatic representation of a horizontal directional drilling machine attached to a drill string.
Figure 9:
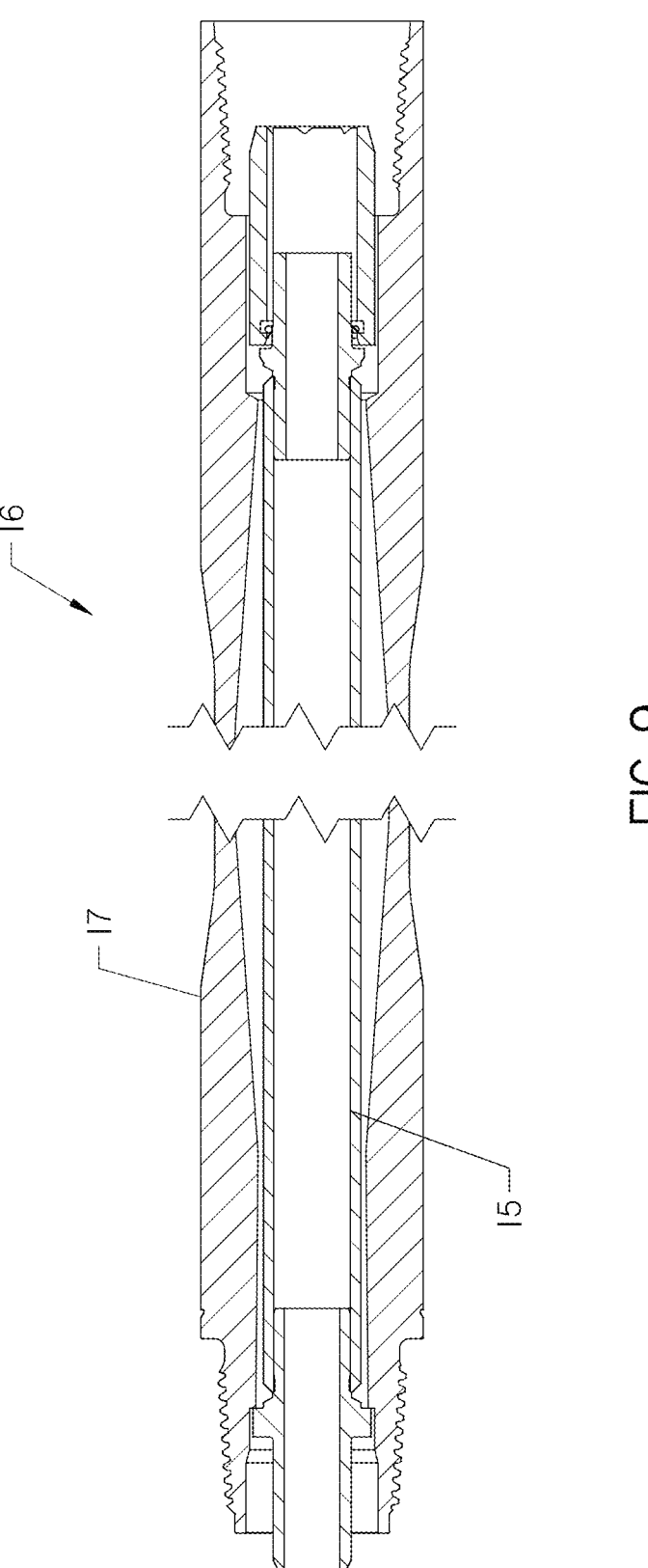
FIG. 9 is a sectional side view of a dual-member pipe section for use with the spindle assembly.

With reference to FIG. 8 and FIG. 9, a directional drilling machine 10 comprises a carriage 12. The carriage 12 provides axial and rotational force and is configured to connect sections of drill pipe 14 end to end to form a drill string 16. The drill string 16 comprises an outer 17 and inner component 15. The inner pipe string 15 is housed within the outer pipe string 17 and may rotate independently of the outer pipe string 17.

The carriage 12 comprises a rotational drive system 20 and a linear drive system. The linear drive system moves the carriage along a rail to provide thrust and pull-back during a drilling operation. The rotational drive system 20, such as the system shown in FIG. 1, is configured to provide torque for adding and removing pipe sections 14 from the drill string 16, and to provide the axial and rotational force used in drilling and backreaming procedures.

Figure 1:
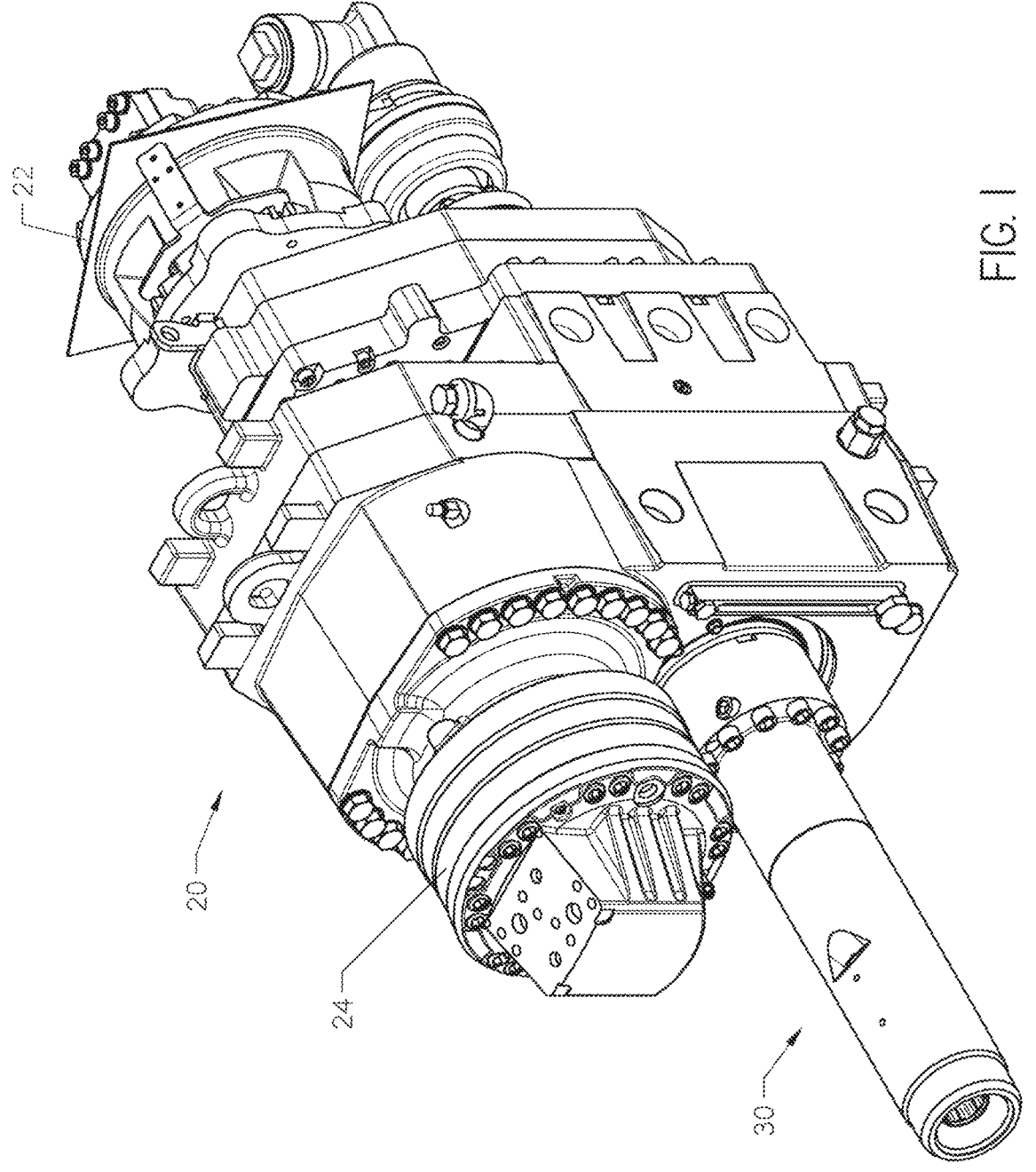
FIG. 1 is dual pipe drill gearbox for use with a horizontal directional drilling machine.
Figure 2:
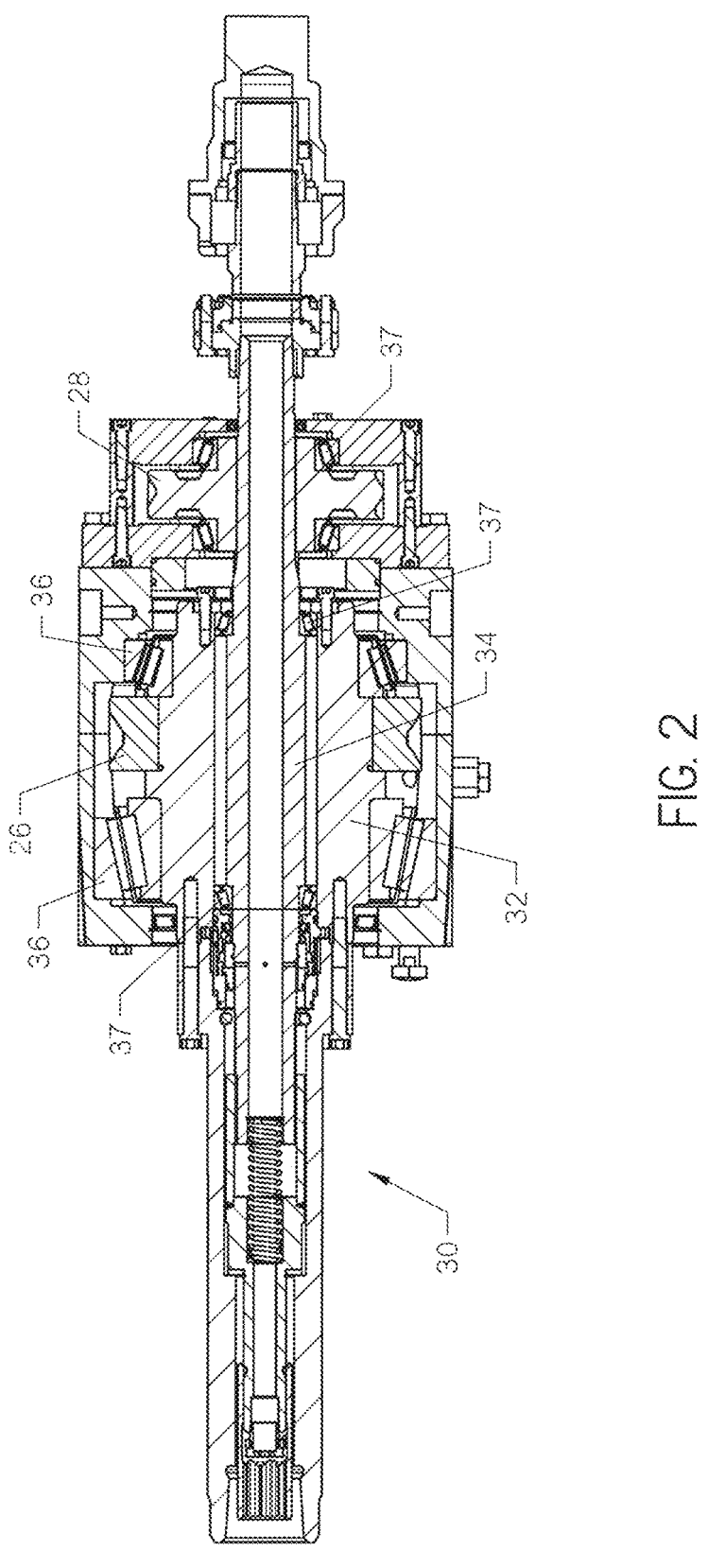
FIG. 2 is a top view cross section of the gearbox of FIG. 1.
Figure 3:
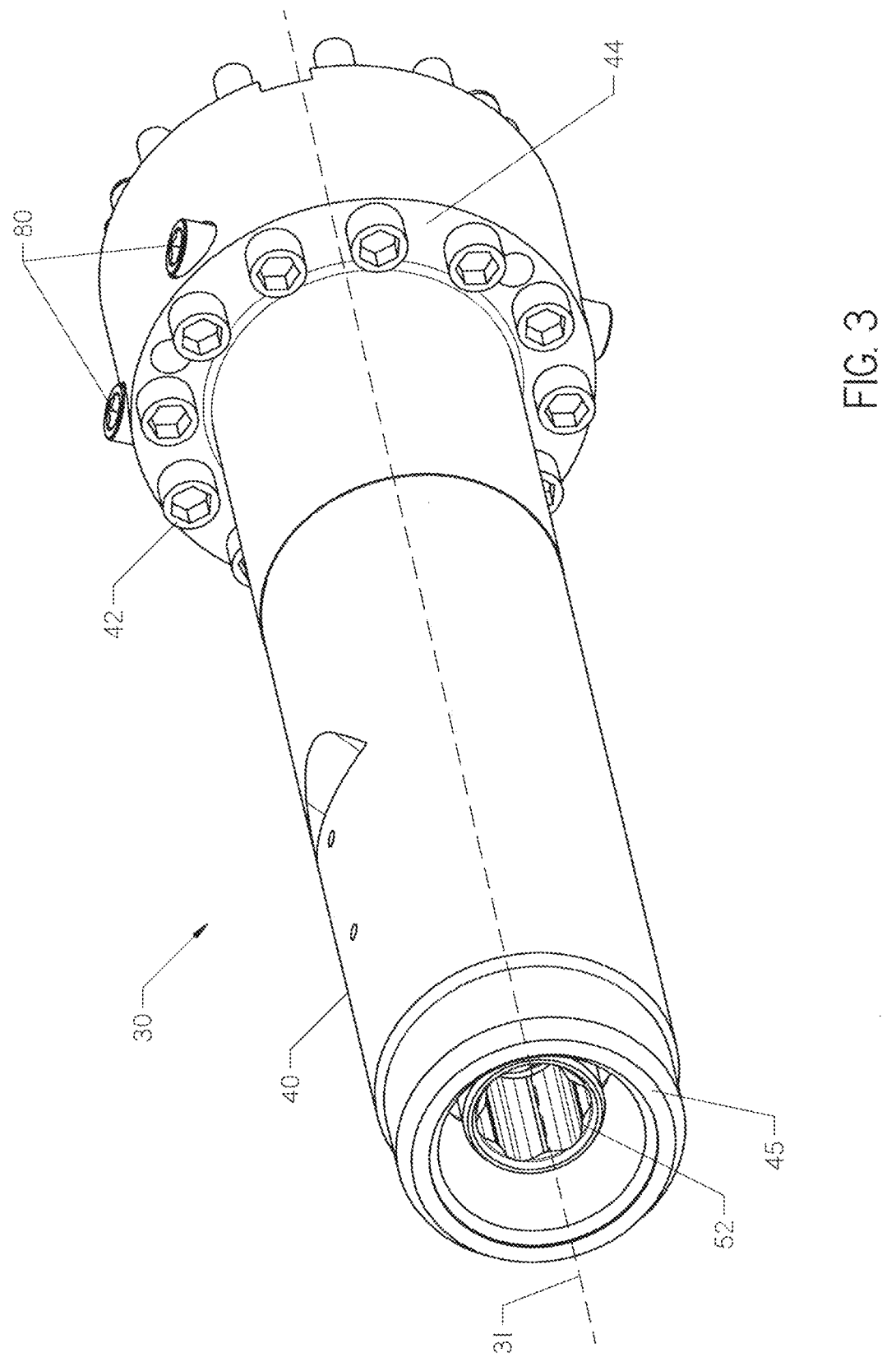
FIG. 3 is a perspective view of the spindle assembly as shown in FIG. 1. The gearbox shown in FIGS. 1-2 is attached to the right of the figure.

With reference to FIGS. 1 and 2, the rotational drive system 20, or gearbox, comprises an inner pipe motor 22 and an outer pipe motor 24. The outer pipe motor 24 provides torque to the outer pipe string and the inner pipe motor 22 provides torque to the inner pipe string. Torque is transferred from the gearbox 20 to the drill string 16 through a spindle 30. The spindle 30 has inner and outer components, as shown in FIGS. 2-7, which are preferably substantially centered about a longitudinal axis 31. The axis 31 is also an axis of rotation for the inner and outer components of the spindle 30.

The gearbox 20 comprises an outer output gear 26 and an inner output gear 28. The outer output gear 26, driven by the outer motor 24, transmits torque to an outer drive shaft 32. Likewise, the inner output gear 28, driven by the inner motor 22, transmits torque to the inner drive shaft 34. The inner drive shaft 34 and outer drive shaft 32 rotate independently of each other. The outer drive shaft 32 is supported by a plurality of outer drive shaft bearings 36. Likewise, the inner drive shaft 34 is held in place by a plurality of inner drive shaft bearings 37. The inner 34 and outer 32 drive shafts transmit torque to the drill string 16 through the spindle 30.

With reference to FIGS. 3-7, components of the spindle 30 are shown. The spindle 30 comprises an outer member 40 which is rotationally joined to the outer drive shaft 32 by a plurality of retainer socket screws 42 disposed in a flange 44 of the outer member 40. The inner drive shaft 34, or a stub joined thereto, is disposed within a cavity 46 formed in the outer member 40. The outer member 40 has an end 48 which is configured for connection to an outer member of the drill string 16. The outer member 40 may also have an opening for a connection to a wireline.

An inner drive rod apparatus 50 is disposed within the outer member 40. The inner drive rod apparatus 50 comprises a collar 52, a drive rod 54, and a hollow sleeve 56. The collar 52 is configured for connection to an inner member of a dual-member drill string 16. As shown, the collar 52 has a torque-transmitting inner profile for imparting rotation to the inner member 15 of the drill string 16. The hollow sleeve 56 may be formed integrally with the drive rod 54 or may be joined by a circumferential weld 58.

The hollow sleeve 56, as shown, has an internal profile 60 which conforms to an outer profile 62 of the drive shaft 34. The profiles 60, 62, are configured for torque-transmitting connection during rotation of the drive shaft 34. However, the profiles 60, 62 are also configured to allow sliding relative movement between the drive shaft 34 and hollow sleeve 56 within a range of motion.

Figure 6:
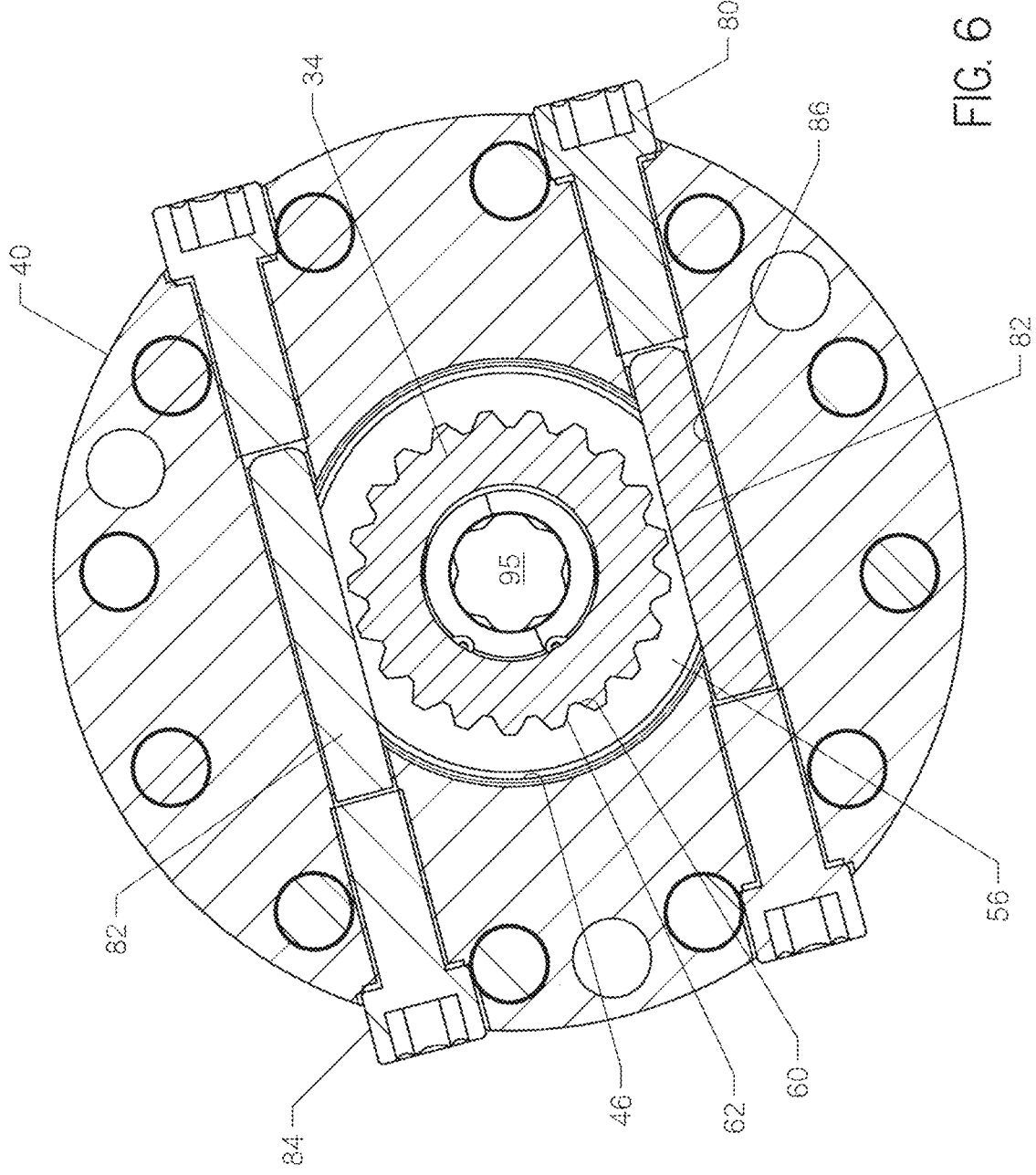
FIG. 6 is a cross sectional end view of the spindle assembly showing a cross-section taken through line 6-6 of FIG. 5.
Figure 7:
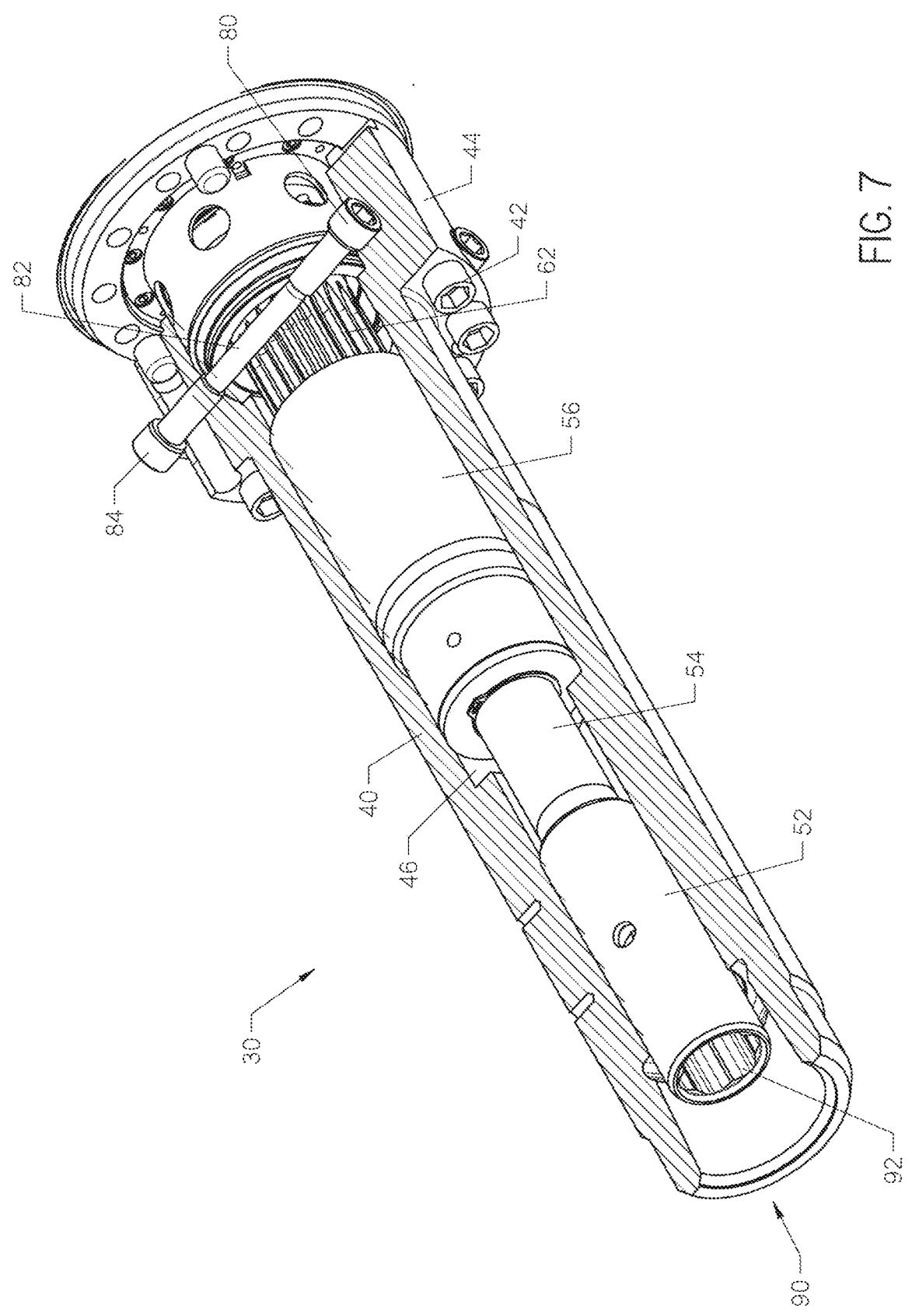
FIG. 7 is a perspective view of the spindle assembly with a portion of the outer member of the spindle and retainer socket screws removed so that internal components of the spindle are visible. The sleeve is shown in the first position of FIG. 4.

As best shown in FIG. 6, the profiles 60, 62 comprise complementary interlocking splines. However, other geometry may be utilized, including, but not limited to polygonal profiles, protrusions or depressions with torque-transmitting elements, and the like. Further, while the profile 60 of the sleeve 56 is shown on its inner surface and the profile 62 of the drive shaft 34 on its outer surface, other orientations which allow relative axial movement but allow torque transmission may be utilized.

Figure 4:
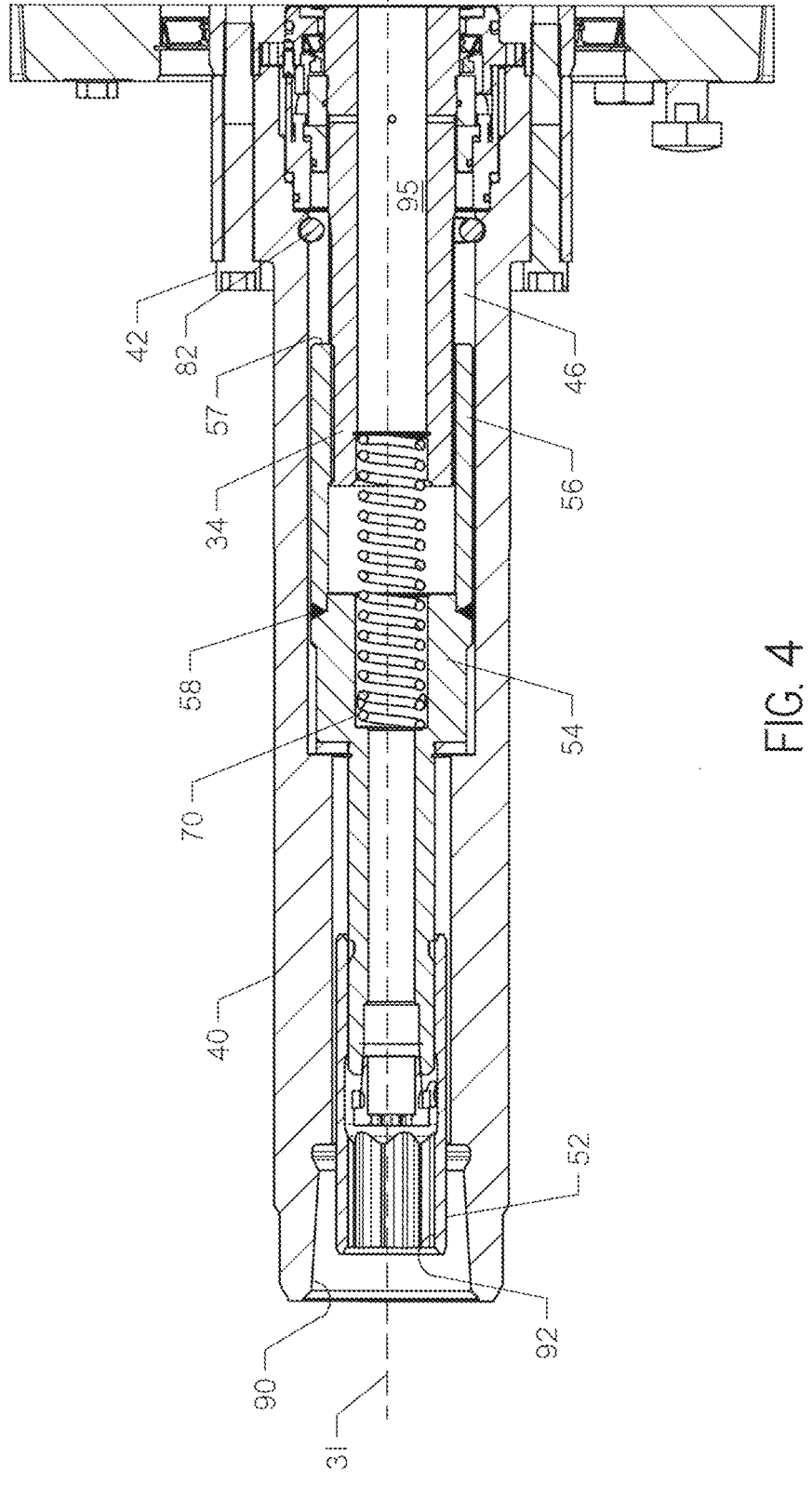
FIG. 4 is a cross section of the spindle assembly attached to the gearbox with the sliding sleeve and inner drive rod in a first position.
Figure 5:
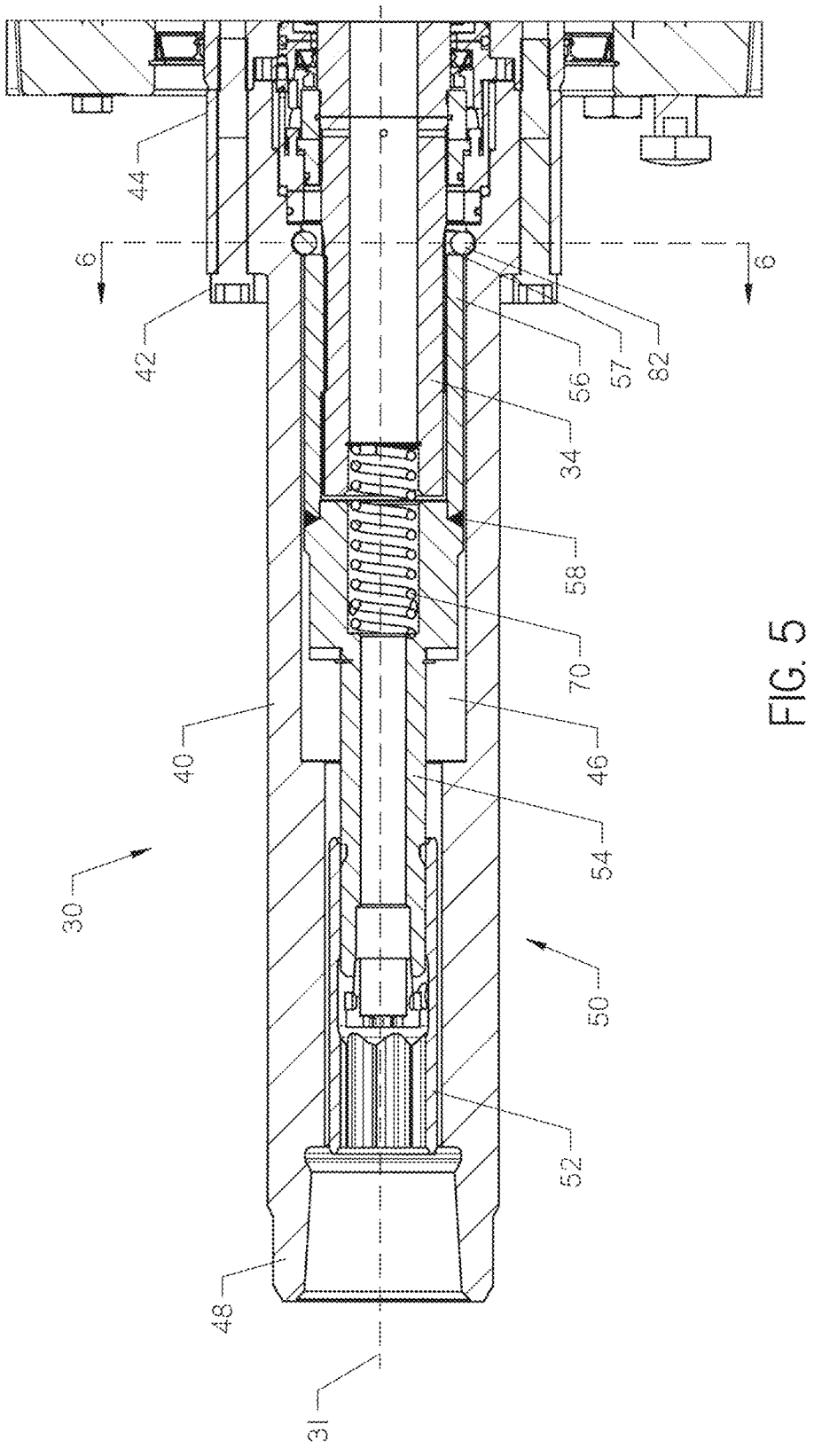
FIG. 5 is the cross section of the spindle assembly of FIG. 4 with the sliding sleeve and inner drive rod in a second, limiting position with the sleeve contacting a dowel rod.

A spring 70 is disposed between the drive shaft 34 and the drive rod 54. The spring 70 biases the drive rod 54 to a forward position as shown in FIG. 4, away from the gearbox 20. As drilling operations continue, the drive rod 54 may be forced in a direction toward the gearbox 20. As shown in FIG. 5, as the spring 70 compresses, the inner drive rod 54 and sleeve 56 are forced axially towards the gearbox 20.

With reference again to FIG. 8, during makeup of a pipe section 14 to the drill string 16, inner and outer pipe connections are made up simultaneously. There is, however, the potential for misalignment between the ends of the inner pipe sections while adjacent outer pipe sections are threadedly connected. This scenario can cause the inner pipe section which is attached to the inner drive rod 54 to be unintentionally forced axially toward the gearbox 20. If the inner drive rod 54 is forced into the gearbox 20, the axial force may be transferred to one or more of the plurality of inner drive shaft 34 or gearbox bearings 37. The force exerted on the bearings 37 may cause considerable damage to the gearbox 20.

The present invention solves this problem by transferring the axial load of the inner drive rod 54 to the outer member 40, and therefore to the outer drive shaft 32. The outer gearbox bearings 36 are much larger than the inner gearbox bearings 37 and may withstand the axial loads which may be exerted by the inner drive rod.

The spindle 30 comprises a stop member 80 defining a limit of the axial movement of the sleeve 56 in a direction toward the gearbox 20. The stop member 80 is preferably transverse to the longitudinal axis 31 of the spindle 30. The sleeve 56 terminates in a shoulder 57. This shoulder 57, at its limit of axial movement, contacts the stop member 80.

The stop member 80 is disposed through the outer member 40. As a result, axial force transmitted through the drill rod 54 and sleeve 56 will transfer to the outer member 40 (and thus components of the outer member's rotational drive) rather than the inner drive shaft 34. The stop member 80 is positioned, as best shown in FIG. 6, such that it reduces the effective inner diameter of the cavity 46 such that it is less than an outer diameter of the sleeve 56, but greater than the outer diameter of the drive shaft 34.

As shown, the stop member 80 comprises two spaced-apart dowel pins 82. Each dowel pin 82 is trapped within a pair of transfer bolts 84. Through-holes 86 are provided in the flange 44 of the outer member 40. The through-holes 86 are spaced such that the pins 82 sit parallel to each other, with one pin situated on each side of the inner drive shaft 34. The distance between the parallel pins 82 is greater than the diameter of the inner drive shaft 34, but less than the diameter of the sleeve 56. This allows the inner drive shaft 34 to rotate independently of the outer member 40 without interference from the dowel pins 82, but does allow engagement between the shoulder of the sleeve 56 and the dowel pins 82. The transfer bolts 84 are preferably sealing bolts to prevent leakage of drilling fluid.

Upon engagement of the sleeve 56 with the dowel pins 82, the axial force that would have been transmitted to the inner drive shaft 34 is now transmitted to the outer member 40, and subsequently to the outer drive shaft 32. As stated above, the outer drive shaft 32 is designed to regularly withstand high axial loads.

To assemble the spindle 30, the outer member 40 is placed over the assembled inner drive components, including the drive rod 54, sleeve 56 and inner drive shaft 34. The outer member 40 is then attached to the gearbox 20 with the retainer socket screws 42. Finally, the dowel pins 82 are inserted into the through holes 86 in the flange 44 and held in place by the installation of the transfer bolts 84.

As shown, the spindle 30 is configured to run drill pipe 14 in the "pin-up" configuration. Each outer pipe section comprises a pin end and a box end. The outer member 40 comprises a box end 90 that may threadedly engage with the pin end of an outer pipe section. The inner drive rod 54 is attached to the collar 52, which may likewise provide a hexagonal box end 92 for connection to an inner pipe section. Other geometric shapes, such as is provided for in Slaughter, may also be used.

Each inner pipe section comprises a pin end with a complementary outwardly facing geometric shape that is slideably receivable within the collar 52. Each inner pipe section comprises a box end and a pin end. This configuration provides transmission of torque between the inner drive rod and an adjacent inner pipe section and between adjacent inner pipe sections. The inner drive shaft 34 and drive rod 54 may comprise an internally-disposed fluid passage 95 centered upon the longitudinal axis 31 of the spindle 30. The passage 95 may be used for the transmission of drilling fluid downhole.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A method of operating a drilling system comprising a dual-member drill string, the method comprising:

rotating an inner drive shaft about a longitudinal axis to apply torque to an inner member of the dual-member drill string through a hollow sleeve, wherein the hollow sleeve is slidably engaged with the inner drive shaft such that the hollow sleeve is axially movable relative to the inner drive shaft while maintaining torque transmission;

simultaneously, rotating an outer drive shaft independently of the inner drive shaft to apply torque to an outer member of the dual-member drill string;

biasing the hollow sleeve away from the inner drive shaft using a compression spring; and transmitting axial force from the hollow sleeve to a stop member, wherein the stop member is configured to transfer axial force to the outer drive shaft.

2. The method of claim 1 in which the stop member comprises at least one dowel pin.

3. The method of claim 1 in which the hollow sleeve and inner drive shaft comprise complementary interlocking splines.

4. The method of claim 1, wherein the outer drive shaft is rotationally driven by an outer output gear coupled to a motor.

5. The method of claim 1, further comprising the step of compressing the spring as the hollow sleeve moves axially toward the inner drive shaft.

6. The method of claim 1, wherein the hollow sleeve terminates in a shoulder, the shoulder configured to contact the stop member to transfer axial force.

7. The method of claim 1, further comprising the step of circulating drilling fluid through a central passage of the inner drive shaft.

8. A method of preventing damage to a gearbox in a dual-member drilling system, the gearbox comprising an inner drive shaft and an outer drive shaft, the method comprising:

rotating the inner drive shaft about a longitudinal axis to apply torque to an inner member of a dual-member pipe segment through a hollow sleeve, wherein the hollow sleeve is slidably engaged with the inner drive shaft to allow axial movement relative to the inner drive shaft while maintaining torque transmission;

simultaneously, rotating the outer drive shaft independently of the inner drive shaft to apply torque to an outer member of the dual-member pipe segment;

biasing the hollow sleeve away from the gearbox with a spring disposed between the inner drive shaft and the hollow sleeve;

permitting axial movement of the hollow sleeve toward the gearbox in response to an axial force applied to the inner member of the pipe segment; and engaging a stop member with the hollow sleeve when the hollow sleeve reaches a limit of axial movement toward the gearbox;

wherein engagement of the stop member transfers axial force to the outer drive shaft.

9. The method of claim 8, wherein the stop member comprises a pair of parallel dowel pins.

10. The method of claim 9 in which the pair of parallel dowel pins are transferred to the longitudinal axis.

11. The method of claim 8 further comprising attaching the hollow sleeve to an inner drive rod, wherein the inner drive rod comprises a collar for connection to the inner member of the dual-member pipe segment.

12. The method of claim 11 in which the hollow sleeve is connected to the inner drive rod by a circumferential weld.

13. The method of claim 8, wherein the hollow sleeve and inner drive shaft comprise complementary interlocking splines.

14. The method of claim 8, wherein the spring is a compression spring, and further comprising the step of compressing the spring in response to axial movement of the hollow sleeve toward the gearbox.

15. The method of claim 8, wherein the outer drive shaft is rotationally driven by an outer output gear coupled to a motor.

16. The method of claim 8 wherein the dual-member pipe segment is characterized as a first dual-member pipe segment and further comprising:

with the inner drive shaft and the outer drive shaft, rotating the first dual-member pipe segment such that the first dual-member pipe segment connects to a second dual-member pipe segment.

17. The method of claim 8 wherein the dual-member pipe segment is characterized as a first dual-member pipe segment and further comprising:

with the inner drive shaft and the outer drive shaft, rotating the first dual-member drive segment such that the first dual-member pipe segment is disconnected from a second dual-member pipe segment.

* * * * *